(No Model.) 3 Sheets—Sheet 1.
J. D. AVERELL.
FURNACE FOR GENERATING ILLUMINATING AND HEATING GAS.
No. 309,595. Patented Dec. 23, 1884.
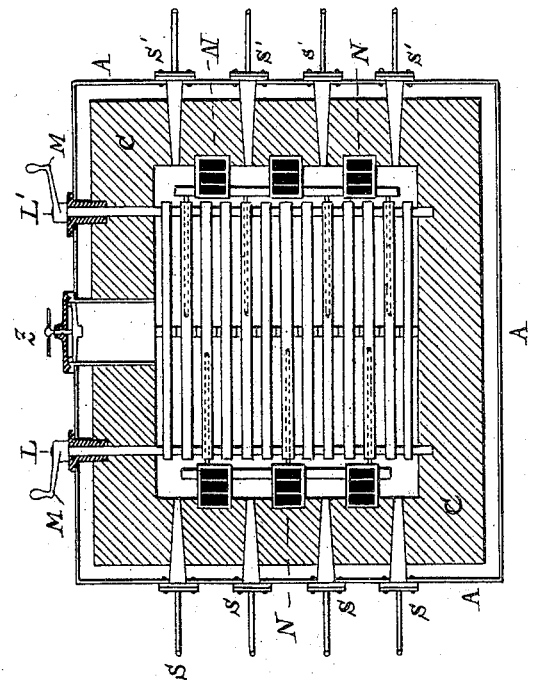
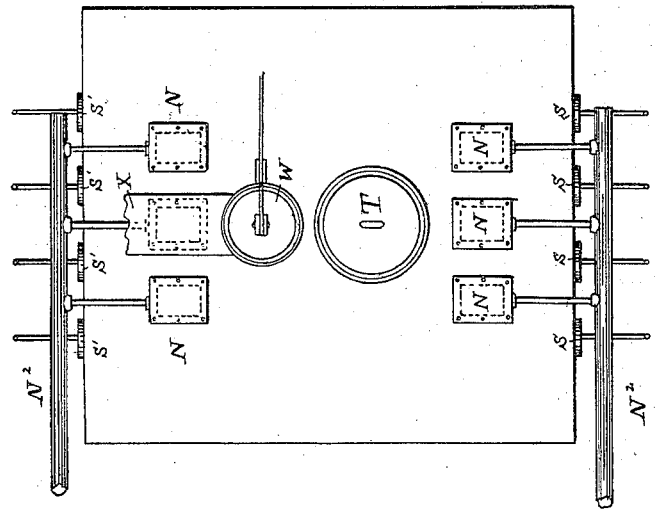
Witnesses
Herman T. C. Kraus
F. C. Knaach
Inventor
John D. Averell (No Model.) 3 Sheets—Sheet 2.
J. D. AVERELL.
FURNACE FOR GENERATING ILLUMINATING AND HEATING GAS.
No. 309,595. Patented Dec. 23, 1884.
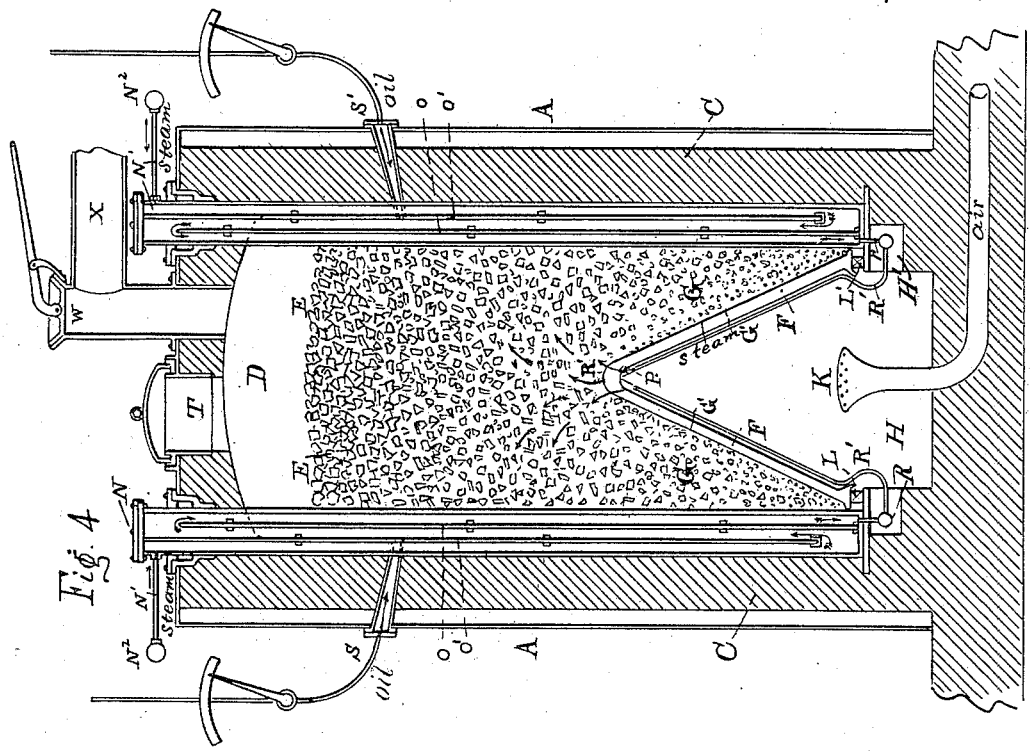
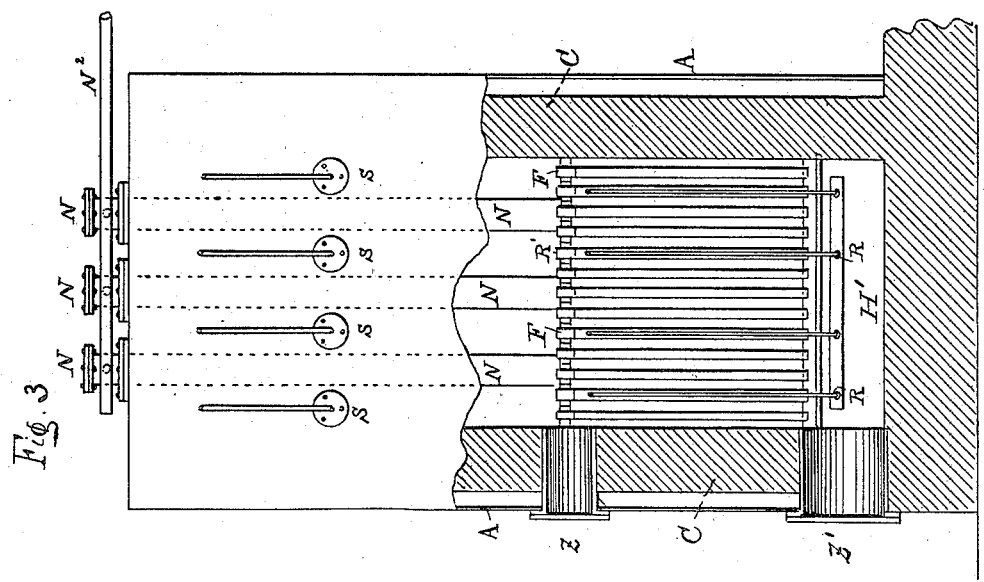
Witnesses
Herman T. C. Kraus
F. C. Knaack
Inventor:
John D. Averell

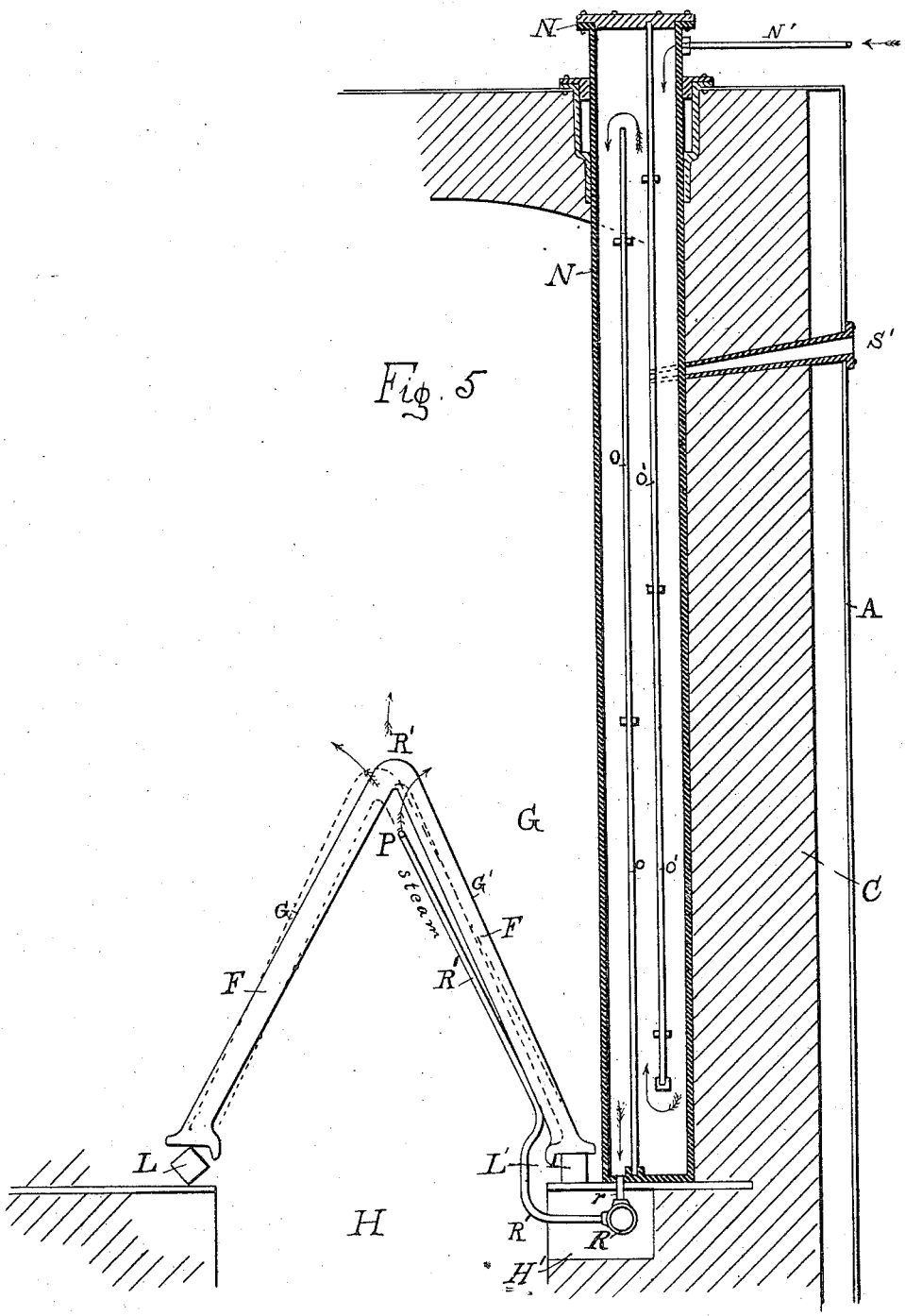

UNITED STATES PATENT OFFICE.

JOHN D. AVERELL, OF NEW YORK, N. Y.

FURNACE FOR GENERATING ILLUMINATING AND HEATING GAS.

SPECIFICATION forming part of Letters Patent No. 309,595, dated December 23, 1884.

Application filed January 11, 1884. (No model.)

*To all whom it may concern:*

Be it known that I, JOHN D. AVERELL, of the city of New York, county and State of New York, have invented Improvements in Furnaces for Generating Illuminating and Heating Gas, of which the following is a specification.

This invention relates to certain improvements in the construction and operation of furnaces for generating an illuminating-gas, known as "water-gas," by the decomposition of superheated steam in contact with incandescent fuel, by vaporizing liquid hydrocarbon in the upper and cooler portion of such fuel, and by combining the gases resulting from the decomposed steam with the hydrocarbon vapors and gas all in the same generating-furnace.

The improvements constituting my invention are embodied in the construction and arrangement of the different parts of the generating-furnace, whereby the operation of superheating the steam and supplying it to the incandescent fuel is simplified and made more effective than heretofore, and whereby the lower portion of the incandescent fuel next to the ash-pit is protected from the deadening action of the steam, and is maintained in a glowing condition during the period of admitting steam and generating gas, so that when the air-blast is admitted for reheating the fuel it will readily ignite at the base and the whole body be quickly reheated, and so that the trouble and delay heretofore caused by dead fuel and clinker above the grate will be overcome and the whole operation of making gas improved.

My invention will now be described in detail with reference to the accompanying drawings, in which—

Figure 1 is a plan as seen from above the furnace. Fig. 2 is a transverse section a short distance below the upper end of the furnace. Fig. 3 is a side elevation of the furnace, with a portion of the outer wall left off to show the grate. Fig. 4 is a vertical section through Fig. 3. Fig. 5 is an enlarged section of a portion of Fig. 4.

At A is shown the outer casing or shell of the furnace, which may be made of plates of boiler-iron or similar plate-work riveted together to form a rectangular chamber fitted in or lined with fire-brick C, which produces the gas-generating chamber D, where the incandescent coal E is supported on the grate-bars F, which are arch-shaped, and, like rafters, support the coal on their opposite sides, as shown at G, between the vertical walls of the chamber and their inclined surfaces, as at G'. These grate-bars are A-shaped, or like a pair of rafters. They span the ash-pit H, which receives the air-blast from a fan through the nozzle K, directly below the center of the arched grate and in the center of the gas-generating chamber. They also rest on or are supported by angular rock-shafts L and L', which extend across under their feet, so that by rotating the shafts by the cranks at M the bars will be tilted, as shown at Fig. 5, for the purpose of removing the ashes, &c. Superheating retorts or chambers are shown at N, and are rectangular or oval-shaped flues for the steam to be introduced at the upper end through the pipes N' from the iron pipe $N^2$, leading from the boiler. (Not shown.) These superheaters are set vertically in recesses in the walls of the generating-chamber about one-third of their width, so that one face and two-thirds of their edges are in direct contact with hot coal in the furnace, as seen in Figs. 2 and 4. Each of these superheaters is provided with partition-plates, as at O and O', the plate O extending from the lower end to near the top, and plate O' extending from the top to near the lower end of the superheater, a passage-way being left at each end, and an extended channel being formed for effectually superheating the steam. The superheated steam is conducted through pipes R' to near the apex of the double-inclined grate, where it is discharged from openings P into the central portion of the body of fuel, where the heat is greatest and decomposition is most complete. Short pipes *r* connect the superheating-chambers on each side of the ash-pit with a horizontal pipe, R, located in a channel, H', formed in the brick-work on each side of the ash-pit, and steam-delivering pipes R', connecting with pipes R, extend upward and inward just below the inclined grate-bars nearly to the apex of the A-shaped grate, whereby they are protected from the fuel, and the steam is discharged directly into the heart of the fuel, where its decomposition is best effected. The hydrocarbon is introduced through nozzles S and S', located on opposite sides of the furnaces and between the superheaters, as best seen in Fig. 2, and a special feature of their location and arrangement with the other parts is that their inlet-nozzles are a few inches below the upper surface of the incandescent coal, as shown in Fig. 4, so that the hydrocarbon is always certain to be volatilized and converted into a gaseous condition before combining with the hydrogen from the steam, which is produced between the grates and the upper surface of the coal, or in the body of the incandescent fuel. The coal is supplied, as usual, through the trap or cover at T, and the products of combustion escape through the valve-opening at W, while the gases to be stored in a holder are carried off through the pipes X to the combining or "fixing" retorts, where they are further heated and combined or fixed. Man-holes are provided at Z and Z' for the workman to enter the furnace both above and below the grates. By such a construction of the grates and their arrangement in the furnace or generator I am able to greatly increase the speed of the charges, for this reason: The incandescent coal that rests in the pockets or angles of the grates will not be extinguished by the steam as it is injected at the apex, and a live fire will be preserved for each new charge below the point of deadening by the steam, and the air is better distributed to the fuel than with a flat grate. Steam and air discharged below a flat grate in a gas-generator are apt to pass up through channels between the fuel and walls of the furnace, and thus fail to act upon the fuel, rendering the operation defective. By my construction of grate and arrangement of steam-discharge pipes in relation thereto, as shown, the above difficulties are avoided and a much improved result secured. The hydrocarbons are not only thoroughly distributed, but are scrubbed by passing through a portion of the coal before being combined with hydrogen gas from the steam, and therefore a more perfect union is easily made when they are finally brought together in the secondary part of the operation.

The generator is operated in the usual manner by first admitting the air-blast and causing combustion of the fuel till it is heated to incandescence, allowing the products of combustion to escape by opening the valve at W, and then, after heating up, shutting off the air-blast and admitting the superheated steam into the fuel, where it is decomposed into carbonic oxide and hydrogen, and also admitting hydrocarbon oil through pipes S S' into the upper portion of the fuel, where it is vaporized and converted into rich gas. The carbonic oxide and hydrogen rising through the fuel combine with the rich oil-gas, resulting in the formation of good illuminating-gas, which is conducted through pipe X to the purifiers and holder.

It is evident that the form of the generator may be changed, as from square to round; but the form here shown is most convenient.

I therefore claim—

1. In combination with a gas-generating furnace, the arched or double-inclined grate extending up into the fuel-chamber, and the steam-supply pipes extending up below the grate nearly to its apex, whereby steam may be discharged into the heart of the fuel and more effectually decomposed.

2. A gas-generating furnace having steam-supply pipes discharging into the fuel above the base thereof, in combination with the arched or double-inclined grate, and an air-blast pipe discharging below such grate, whereby the fuel is not deadened by steam at the base and may be readily ignited by the air-blast.

3. In combination with a gas-generating furnace, the vertically-arranged superheating-chambers projecting from the wall into the fuel-chamber, and having division-plates for forming an extended steam-channel, a steam-supply pipe connecting at the top and a discharge-pipe connecting at the bottom.

4. In combination with the furnace, the vertical steam-superheating chambers, the horizontal pipe R, connected with their lower ends, and the discharge-pipes R', leading therefrom to the point of discharge below the grate.

5. The gas-generating furnace having one or more channels, H', formed in the wall adjacent to the ash-pit, in combination with vertical superheating-chambers, connected pipe R, laid in channel H', and discharge-pipes R', for the purpose described.

6. In combination with the generator, the vertical steam-superheating chambers having supply and discharge pipes, and the oil-supply pipes or nozzles connecting with the upper part of the fuel-chamber between the steam-superheating chambers, as described.

JOHN D. AVERELL.

In presence of—
HERMAN T. C. KRAUS,
BOYD ELIOT.